C. MOE.
VALVE.
APPLICATION FILED JAN. 27, 1916.
1,265,807.
Patented May 14, 1918.
2 SHEETS—SHEET 1.
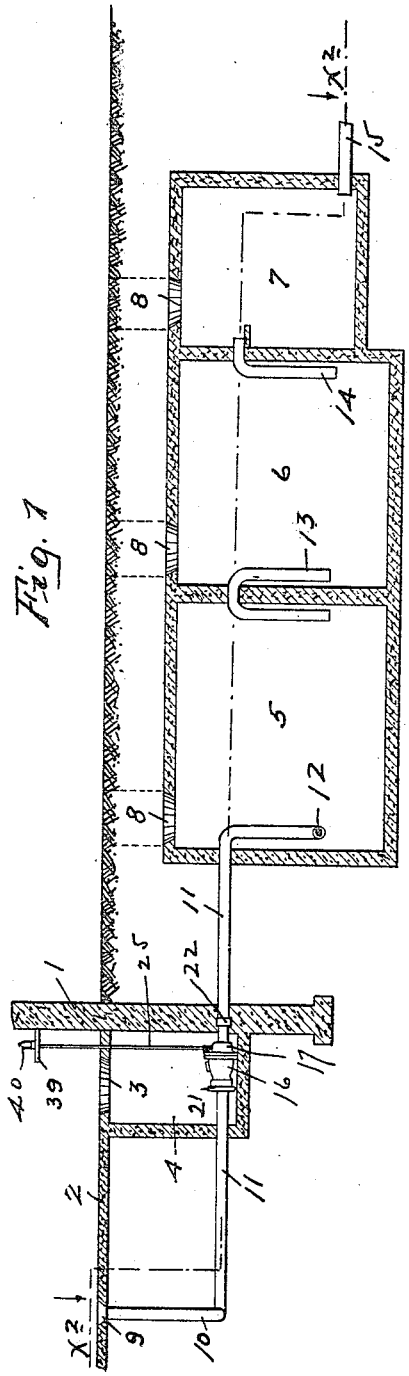
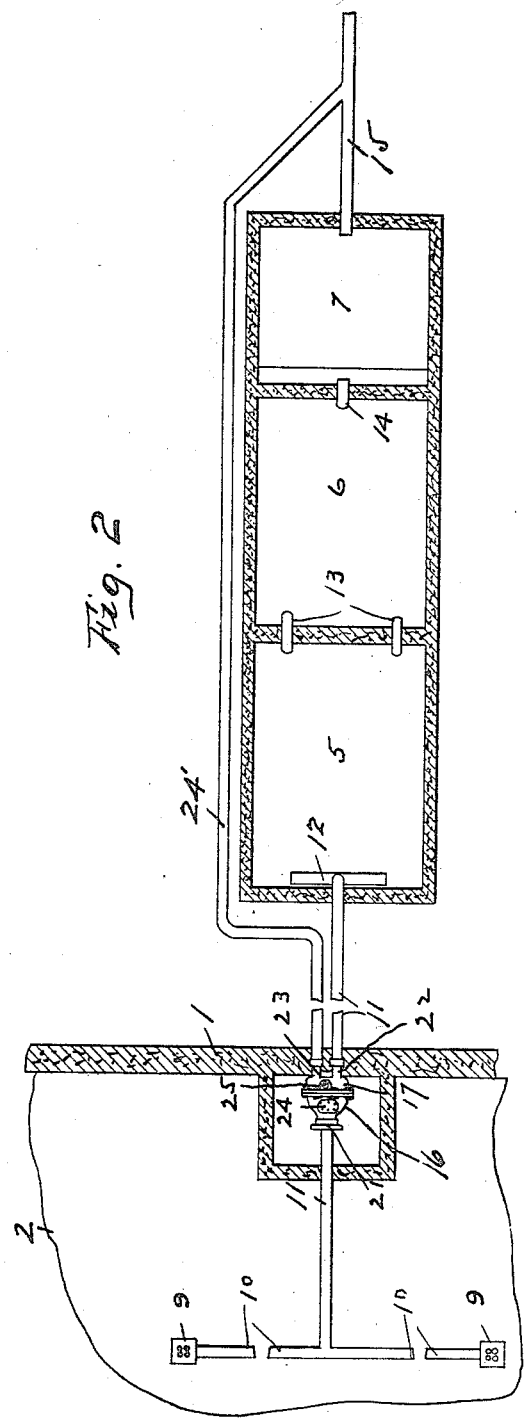
WITNESSES
E. C. Skinkle
H. D. Kilgore
INVENTOR
CHRIST MOE
BY HIS ATTORNEYS
Williamson & Merchant

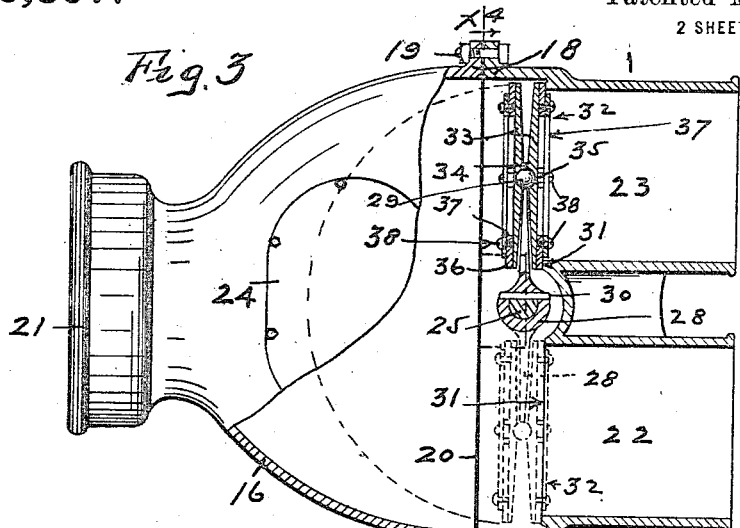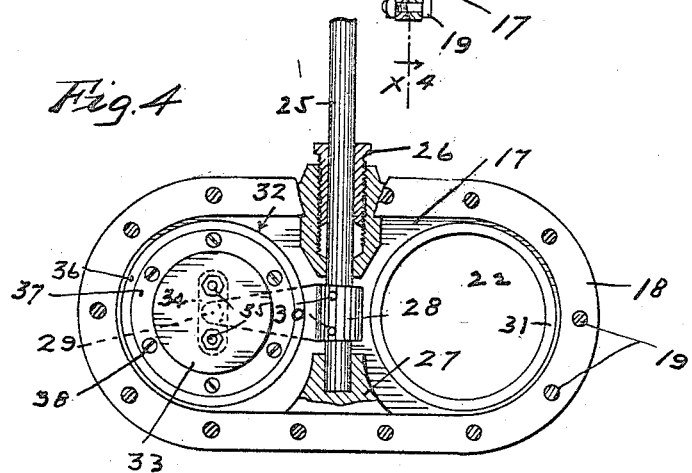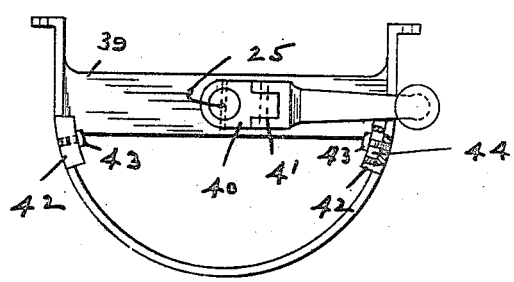

UNITED STATES PATENT OFFICE.

CHRIST MOE, OF HANSKA, MINNESOTA.

VALVE.

1,265,807.　　　　Specification of Letters Patent.　　Patented May 14, 1918.

Application filed January 27, 1916. Serial No. 74,591.

*To all whom it may concern:*

Be it known that I, CHRIST MOE, a citizen of the United States, residing at Hanska, in the county of Brown and State of Minnesota, have invented certain new and useful Improvements in Valves; and I do hereby declare the following to be a full, clear, and exact description of the invention, such as will enable others skilled in the art to which it appertains to make and use the same.

My invention relates to improvements in valves having a wide range of usage, but especially adapted for use in connection with sewer systems of the septic tank type and particularly in connection with such sewer systems for creameries, cheese factories, and other plants, wherein a great deal of water is used in washing the machinery and the walls and floors of the building. As is well known, when too much water is discharged into a septic sewage tank, the deposits are too thin and satisfactory bacterial action will not take place. By the use of my improved valve, sewage may be discharged, at will, directly into the septic sewage tank or into a branch pipe, arranged to carry the sewage around said tank and deposit the same into the drain pipe leading from the septic sewage tank.

To the above end, generally stated, the invention consists of the novel devices and combinations of devices hereinafter described and defined in the claim.

In the accompanying drawings, which illustrate the invention, like characters indicate like parts throughout the several views.

Referring to the drawings,

Figure 1 is a view, principally in vertical section, showing the invention incorporated in a sewage system of the septic tank type;

Fig. 2 is a view, principally in horizontal section taken on the irregular line $x^2$ $x^2$ of Fig. 1;

Fig. 3 is a view of the improved valve, partly in plan and partly in horizontal central section, on an enlarged scale;

Fig. 4 is a view in transverse section taken on the irregular line $x^4$ $x^4$ of Fig. 3; and Fig. 5 is a plan view of an actuating lever and coöperating lock bracket for the improved valve.

The numeral 1 indicates one of the walls of a creamery or other building and the numeral 2 indicates the ground floor thereof, having a cover-equipped manhole 3, which leads to a pit 4.

Outside of the building and located under the ground, is a septic sewage tank comprising a primary settling chamber 5, a secondary settling chamber 6 and a filtering chamber 7. Access may be had to any one of said chambers through cover-equipped manholes 8. Located in the floor 2 are two floor drains 9 connected by branch sewage pipes 10 to a main sewage pipe 11. This main sewage pipe 11 extends through the pit 4, wall 1, into the settling chamber 5 and terminates, within said chamber, in a discharge head 12. Liquid in the settling chamber 5 overflows into the settling chamber 6 through two yoke-like pipes 13 mounted in the wall between the settling chambers. From the settling chamber 6, the liquid overflows into the filtering chamber 7 through a pipe 14 mounted in the wall between the settling chamber 6 and filtering chamber 7. A drain pipe 15 leads from the filtering chamber 7. The parts, thus far described, have been illustrated simply for the purpose of showing the invention applied in working position and may be of any desired construction.

Referring now in detail to the invention, the casing of the improved valve is located within the pit 4. This valve casing is transversely divided and comprises sections 16 and 17 having at their abutting edges outturned flanges 18, through which are passed draw bolts 19 for detachably connecting said two sections. A suitable packing 20 is interposed between the flanges 18 to afford a water-tight joint. Integrally formed with the valve casing 16, is an inlet 21 and integrally formed with the valve casing 17, are two outlets 22 and 23. The valve casing 16 is also provided with a hand hole normally closed by a cover 24 bolted thereto. One section of the main pipe 11 extends into and is secured to the inlet 21 and the other section thereof is telescoped onto the outlet 22 and secured thereto. A branch sewage pipe 24' leads from the outlet 23 around the septic sewage tank and taps the drain pipe 15, as shown in Fig. 2.

The lower end of a long vertically extended valve stem 25 is telescoped through a stuffing box 26 on the valve casing section 17 and journaled in a bearing 27 in the chamber of said casing. The hub of an arm 28 is telescoped onto the valve stem 25 and is located between the stuffing box 26 and bearing 27 with freedom for horizontal swinging movement and has, on its free end, the ball member 29 of a ball and socket joint. Pins 30 passed through the hub of the arm 28 and notches on the valve stem 25 rigidly secure said arm to the valve stem. Surrounding the receiving end of each outlet 22 and 23, is a valve seat 31.

The outlets 22 and 23 are alternately closed by a double faced self-seating valve 32. This valve 32 comprises a pair of laterally spaced disk-like valve plates 33, having on their inner faces coöperating half sockets 34 in which the ball 29 of the ball and socket joint, is mounted. Nut-equipped bolts 35 detachably connect the valve plates 33 and hold the members of the ball and socket joint assembled. As best shown in Fig. 3, the arm 28 extends horizontally between the valve plates 33 and is spaced apart therefrom to allow a limited universal movement of the valve 32, with respect to its stem 25. On the outer face each valve plate 33, is an annular packing 36 of suitable pliable material, arranged to be seated against or on the respective valve seat 31. The packings 36 are removably secured to the valve plates 33 by flat metal rings 37 and machine screws 38 passed through the rings 37, packings 36 and screwed into the valve plates 33. By connecting the valve to the arm 28 by a universal joint, said valve will readily adjust itself to either of the valve seats 31 and it is, therefore, not necessary to have said valve seats located in a true plane, with respect to each other.

The valve stem 25 extends through the floor 2 and its upper end portion is journaled in a bracket 39, secured to the wall 1. Keyed to the valve stem 25, from horizontal swinging movement over the upper face of the bracket 39, is a hand crank 40 having a joint 41 arranged to permit the hand piece equipped end of said crank to be raised and lowered. A pair of circumferentially spaced stop lugs 42 are secured to the bracket 39 with which the hand crank 40 engages to hold the valve 32 on either of the valve seats 31. The stop lugs 42 are secured to the bracket 39 by machine screws 43 which extend through horizontal slots 44 in the stop lugs 42 and are screwed into the bracket 39. By loosening the screws 43, the stop lugs 44 may be adjusted circumferentially on the bracket 39. In place of the hand crank 40, any other suitable device may be provided for actuating the valve 32 from a distant point. By lifting the outer end portion of the hand crank 40, the same may be carried out of engagement with the respective stop lug 42, and then by swinging the said hand crank horizontally, the valve 32 may be oscillated from one valve seat to the other.

In addition to the stop lugs 42, the pressure of the liquid in the valve chamber will assist in holding the valve 32 seated. Normally the valve 32 will be secured in a position to close the outlet 23, thereby causing the sewage to discharge directly into the septic sewage tank. When a large amount of water is used for washing the machinery or other purposes, the valve 32 may be swung into a position to close the outlet 22, thereby causing the sewage to flow from valve chamber through the branch pipe 24 and into the drain pipe 15.

What I claim is:

A valve casing having an intake and two outlets, of a valve stem, an arm on the valve stem located in the valve casing and having on its free end the ball member of a ball and socket joint, a double-faced valve comprising a pair of laterally spaced valve plates between which said arm projects and having on their inner faces coöperating half sockets affording the socket member of said ball and socket joint, and nut-equipped bolts detachably connecting said valve plates and holding the members of said ball and socket joint assembled said bolts being located on opposite sides of said ball.

In testimony whereof I affix my signature in presence of two witnesses.

CHRIST MOE.

Witnesses:
C. I. WEDGE,
CLIFFORD HELLING.

Copies of this patent may be obtained for five cents each, by addressing the "Commissioner of Patents, Washington, D. C."